(12) United States Patent
Im et al.

(10) Patent No.: US 11,948,180 B2
(45) Date of Patent: Apr. 2, 2024

(54) SYSTEM AND METHOD FOR RECOMMENDING REPEAT-PURCHASE PRODUCTS USING MODIFIED SELF-SIMILARITY

(71) Applicant: UIF (University Industry Foundation), Yonsei University, Seoul (KR)

(72) Inventors: Il Im, Seoul (KR); Seok Yoon Suh, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 298 days.

(21) Appl. No.: 17/393,598

(22) Filed: Aug. 4, 2021

(65) Prior Publication Data

US 2022/0101406 A1 Mar. 31, 2022

(30) Foreign Application Priority Data

Sep. 28, 2020 (KR) .......................... 10-2020-0125566

(51) Int. Cl.
*G06Q 30/00* (2023.01)
*G06F 17/11* (2006.01)
(Continued)

(52) U.S. Cl.
CPC ......... *G06Q 30/0631* (2013.01); *G06F 17/11* (2013.01); *G06F 17/16* (2013.01); *G06F 17/18* (2013.01); *G06Q 30/0641* (2013.01)

(58) Field of Classification Search
None
See application file for complete search history.

(56) References Cited

U.S. PATENT DOCUMENTS 7,280,974 B2 * 10/2007 Blanchard .......... G06Q 30/0241
705/7.31
10,304,082 B1 * 5/2019 Bhagat ............... G06Q 30/0255
(Continued)

FOREIGN PATENT DOCUMENTS

KR 10-2010-0070661 6/2010
KR 10-2083257 3/2020

OTHER PUBLICATIONS

Rahul Bhagat; "Buy It Again: Modeling Repeat Purchase Recommendations"; KDD 2018, Aug. 19-23, 2018, London, United Kingdom (Year: 2018).*
(Continued)

*Primary Examiner* — Kathleen Palavecino
(74) *Attorney, Agent, or Firm* — LEX IP MEISTER, PLLC

(57) ABSTRACT

Disclosed herein are a system and method for recommending repeat-purchase products using modified self-similarity. The system is operated by a computer in an environment in which user equipment (UE), a database, and a web server are connected over a network. The system includes: a user information reception unit configured to receive user information from the database when the UE connects with the web server; a modified self-similarity calculation unit configured to calculate a modified self-similarity (MSS) using the user information received by the user information reception unit; a similarity calculation unit configured to calculate the sums of similarities between products by substituting the modified self-similarity, calculated by the modified self-similarity calculation unit, into an inter-product similarity calculation matrix; and a product recommendation unit configured to align the sums of similarities between products calculated by the similarity calculation unit and to transmit product information fulfilling preset criteria to the UE.

15 Claims, 7 Drawing Sheets

(51) Int. Cl.
*G06F 17/16* (2006.01)
*G06F 17/18* (2006.01)
*G06Q 30/0601* (2023.01)

(56) References Cited

U.S. PATENT DOCUMENTS

| | | | | |
|---|---|---|---|---|
| 2011/0107260 | A1* | 5/2011 | Park | G06Q 10/04 715/811 |
| 2013/0173419 | A1* | 7/2013 | Farber | G06Q 30/0631 705/26.7 |
| 2013/0246300 | A1* | 9/2013 | Fischer | G06Q 30/0206 705/347 |
| 2013/0325640 | A1* | 12/2013 | Morgan | G06Q 50/12 705/15 |
| 2017/0046768 | A1* | 2/2017 | Kumari | G06Q 30/0631 |
| 2018/0330270 | A1* | 11/2018 | Dorner | G06F 16/2462 |
| 2019/0108571 | A1* | 4/2019 | Kar | G06Q 10/087 |
| 2019/0147463 | A1* | 5/2019 | Karmakar | G06N 20/00 705/7.31 |
| 2022/0129709 | A1* | 4/2022 | Canal | G06F 17/11 |

OTHER PUBLICATIONS

KIPO, Office Action of Application No. 10-2020-0125566, dated Mar. 16, 2022.

\* cited by examiner

Fig 5

|  | Item 1 | Item 2 | Item 3 | Item 4 | ... | Item n |
|---|---|---|---|---|---|---|
| Item 4 |  |  |  |  |  |  |
| Item 57 |  |  |  |  |  |  |
| Item 96 |  |  |  |  |  |  |
| Item 200 |  |  |  |  |  |  |

Items purchased by a user (4 Items) — (n-4) Items

Fig 6

|  | Item 1 | Item 2 | Item 3 | Item 4 | ... | Item n |
|---|---|---|---|---|---|---|
| Item 4 |  |  |  |  |  |  |
| Item 57 |  |  |  |  |  |  |
| Item 96 |  |  |  |  |  |  |
| Item 200 |  |  |  |  |  |  |

Items purchased by a user (4 Items) — Total items (n Items)

Fig 7

|  | Item 1 | ... | Item 4 | ... | Item 57 | ... | Item n |
|---|---|---|---|---|---|---|---|
| Item 4 |  |  | 1 |  |  |  |  |
| Item 57 |  |  |  |  | 1 |  |  |
| Item 96 |  |  |  |  |  |  |  |
| Item 200 |  |  |  |  |  |  |  |
| Sum of similarities | 0.xx | 1.xx | 2.xx | 0.xx | 1.xx | 0.xx | 1.xx |

Items purchased by a user (4 Items) — Total items (n Items)

Fig 8

|  | Item 1 | ... | Item i | ... | Item n |
|---|---|---|---|---|---|
| ... |  |  |  |  |  |
| Item i |  |  | MSS (i, j) |  |  |
| ... |  |  |  |  |  |
| Item m |  |  |  |  |  |
| Sum of similarities |  |  |  |  |  |

Columns: Total items (n items)
Rows (Item i ... Item m): Items purchased by j (m items)

Fig 9

|  | Top 3 recommendation | Top 5 recommendation | Top 7 recommendation | Top 10 recommendation |
|---|---|---|---|---|
| Bestseller recommendation | 0.1066 | 0.1155 | 0.1104 | 0.1030 |
| Item similarity-based collaborative filtering | 0.0554 | 0.0607 | 0.0609 | 0.0590 |
| Most purchased product and bestseller combination method | 0.2194 | 0.2098 | 0.1969 | 0.1776 |
| Most purchased product recommendation and collaborative filtering combination method | 0.0665 | 0.0748 | 0.0780 | 0.0795 |
| Modified self-similarity-based recommendation system | 0.2294 | 0.2180 | 0.2034 | 0.1840 |

SYSTEM AND METHOD FOR RECOMMENDING REPEAT-PURCHASE PRODUCTS USING MODIFIED SELF-SIMILARITY

CROSS-REFERENCE TO RELATED APPLICATION

This application claims the benefit of Korean Patent Application No. 10-2020-0125566 filed on Sep. 28, 2020, which is hereby incorporated by reference herein in its entirety.

BACKGROUND

1. Technical Field

The present invention relates to a product recommendation system and method. More particularly, the present invention relates to a system and method for recommending repeat-purchase products using modified self-similarity.

2. Description of the Related Art

As the technology for collecting, processing, and analyzing big data has dramatically advanced, it has become possible for e-commerce companies to provide more relevant and meaningful shopping experiences to customers by recommending suitable items to customers through recommendation systems.

Although there are various techniques for recommendation systems, a representative recommendation system technique actively used by many e-commerce companies is Collaborative Filtering (CF). Collaborative filtering is a technique for selecting recommended items by measuring similarities between consumers or items based on past purchase records. A consumer's preference for products that the consumer has not yet purchased is predicted based on the consumer's past purchase product history, and then products are recommended in the descending order of the expected preference.

However, since the conventional collaborative filtering recommendation technique has a basic structure configured to recommend new products as described above, there is a limitation in that it is impossible to recommend products that a consumer has already purchased.

For content product domains such as music, dramas, movies, and books, for which recommendation of new products is suitable, the collaborative filtering recommendation technique shows high performance. In contrast, for product domains such as diapers, bottled water, toilet paper, and vitamin supplements, for which repeat repurchases are observed, the recommendation performance of the collaborative filtering recommendation technique is poor. In the present specification, the recommendation for a product that a consumer has already purchased is defined as "repeat-purchase recommendation."

The collaborative filtering algorithm receives the evaluations about a product from users in the form of scores, extracts persons (hereinafter referred to as the "reference group") who have made evaluations similar to those of a certain user in focus (hereinafter referred to as the "current user"), and selects and recommends one or more products that the current user has not currently purchased among products that the reference group evaluated as being satisfactory.

The collaborative filtering recommendation technique is based on the calculation of the similarity between consumers or between products. The similarity between consumers or between products is used to calculate the similarity in the collaborative filtering recommendation technique. The similarity between consumers means how similar the compositions of products purchased by the consumers or the patterns of product evaluations are. For example, in the case where the similarity between consumers is utilized, when consumer A has purchased products 1, 2, and 3 and consumer B has purchased products 1, 2, 3, and 4, it can be determined that consumer A has a high similarity with consumer B. Through this, product 4, which is a product purchased by consumer B having a high similarity to consumer A and has not yet been purchased by consumer A, is recommended to consumer A. In the case of the collaborative filtering recommendation method based on the similarity between users, a repeat-purchase recommendation for a product that consumer A has already purchased is not made.

Meanwhile, the similarity between products means how many consumers with similar purchase histories have made the purchases of products. In the case where the similarity between products is used, when the consumers who have purchased product 1 are consumers A, B, C, and D, and the consumers who have purchased product 2 are consumers A, B, and C, it may be considered that product 1 has a high similarity with product 2. Through this, product 2 is recommended to a consumer who has purchased product 1 but has not yet purchased product 2. The collaborative filtering recommendation technique using the similarity between products does not allow repeat-purchase recommendation for products that a consumer has already purchased, like the collaborative filtering technique using the similarity between users.

When the conventional collaborative filtering recommendation technique based on the similarity between products intends to include in a recommendation list even the products that the consumer has purchased in the past, each of the products purchased in the past has a similarity of 1 to the product itself. In the present specification, the similarity of a product to the product itself is defined as "self-similarity."

For example, the self-similarity between product A and product A has a value of 1. In other words, in the process of selecting products with a high similarity to the products purchased by the consumer, all products that the consumer has already purchased have a self-similarity value of 1 regardless of whether the consumer has purchased a product once or multiple times, so that a problem arises in that the differences in the number of purchases between the products purchased by the customer are not incorporated into recommendation.

In other words, when repeat-purchase recommendation is attempted through the conventional collaborative filtering recommendation technique, the differences in consumer preference between purchased products cannot be incorporated into recommendation. This has a limitation in that the fact that a product repurchased by a consumer multiple times has a higher probability of repurchasing it again than a product purchased only once cannot be incorporated into the recommendation system.

Furthermore, when a repeat-purchase recommendation is attempted in the conventional collaborative filtering recommendation method, the self-similarities of products become 1 when a consumer has purchased the products at least once, without making a distinction between a product frequently repurchased and a product never repurchased.

In addition, the conventional collaborative filtering recommendation technique has a limitation in that it cannot utilize information other than similarity information based on a consumer's purchase history for recommendation.

Studies on systems for recommending products that have already been purchased are also being conducted recently. However, there has been no attempt to utilize information about the similarity between products, which is an advantage of the collaborative filtering recommendation technique, in the repeat-purchase recommendation system.

Moreover, existing studies on systems for recommending products that have been repeatedly purchased do not suggest measurement and evaluation methods for consumers to which the utilization of the repeat-purchase recommendation system is helpful.

RELATED ART DOCUMENTS

Patent document 1: Korean Patent Application Publication No. 10-2020-0080024 (published on Jul. 6, 2020)

Patent document 2: Korean Patent No. 10-2050738 (published on Nov. 26, 2019)

SUMMARY

A system and method for recommending repeat-purchase products using modified self-similarity according to the present invention have the following objects:

First, the present invention intends to recommend products while taking into consideration a user's repeat-purchase propensity.

Second, the present invention intends to apply a collaborative filtering recommendation system that utilizes the similarity between products, which is an advantage of collaborative filtering, for recommendation in a repeat-purchase recommendation system.

Third, the present invention enables a company and an analyst to freely devise and select pieces of information necessary for repeat-purchase recommendation as well as regular recommendation.

The objects of the present invention are not limited to the above-described objects, and other objects that have not been described above will be clearly understood by those of ordinary skill in the art to which the present invention pertains from the following description.

According to an aspect of the present invention, there is provided a system for recommending repeat-purchase products using modified self-similarity, the system being operated by a computer in an environment in which user equipment (UE), a database, and a web server are connected over a network, the system including: a user information reception unit configured to receive user information from the database when the UE connects with the web server; a modified self-similarity calculation unit configured to calculate a modified self-similarity (MSS) using the user information received by the user information reception unit; a similarity calculation unit configured to calculate the sums of similarities between products by substituting the modified self-similarity, calculated by the modified self-similarity calculation unit, into an inter-product similarity calculation matrix; and a product recommendation unit configured to align the sums of similarities between products calculated by the similarity calculation unit and to transmit product information fulfilling preset criteria to the UE.

In an embodiment, the user information received by the user information reception unit may include information about a user's past purchased products and information about the numbers of purchases.

In an embodiment, the modified self-similarity calculation unit may include a repurchase rate calculation unit, a preference calculation unit, and a weight assignment unit, and may calculate the modified self-similarity by Equation 1 below:

$$MSS(i,j) = \text{Repurchase rate}(i) \times \text{Preference}(i,j) \times \text{Weight} \quad (1)$$

where MSS is the modified self-similarity, MSS(i,j) is the modified self-similarity value of consumer j for product i, Repurchase rate (i) is the repurchase rate of product i, Preference(i,j) is consumer j's preference for product i, and Weight is a weight value.

In an embodiment, the repurchase rate calculation unit may calculate the repurchase rate by Equation 2 below:

$$\text{Repurchase rate}(i) = 1 - \frac{\text{Users}(i, 1)}{\sum_{k=1}^{\max} \text{Users}(i, k)} \quad (2)$$

where Users(i,k) denotes the number of consumers who have purchased product i k times.

In an embodiment, the preference calculation unit may calculate the preference by Equation 3 below:

$$\text{Preference}(i, j) = \frac{\text{amount}(i, j)}{\sum_{i=1}^{n} \text{amount}(i, j)} \quad (3)$$

where amount(i,j) denotes the quantity of products i purchased by consumer j, and n denotes the total number of products.

In an embodiment, the modified self-similarity calculation unit may further include a purchase probability calculation unit, and may calculate a purchase probability by Equation 4 below:

$$P_C(i, j) = \frac{1}{|(R_t - C_t(i, j)) - P_c(i)|} \quad (4)$$

where $P_c(i,j)$ denotes a probability that consumer j will purchase product i according to a degree to which a purchase cycle arrives, $R_t$ denotes a time at which the recommendation system makes a recommendation, $C_t(i,j)$ denotes a point in time at which consumer j last purchased product i, the value of $(R_t - C_t(i,j))$ denotes the interval between the time at which a recommendation is made and the time at which consumer j last purchased product i, and $P_c(i)$ denotes the mode or median of a repurchase cycle time of product i.

In an embodiment, the modified self-similarity calculation unit may combine the purchase probability and calculate the modified self-similarity for a product having a product purchase cycle, as in Equation 5 below:

$$MSS(i,j) = \text{Repurchase rate}(i) \times \text{Preference}(i,j) \times P_c(i,j) \times \text{Weight} \quad (5)$$

In an embodiment, the modified self-similarity calculation unit may further include a repeat-purchase propensity calculation unit, and may calculate a repeat-purchase propensity by Equations 6 and 7 below:

$$\text{Stickiness}(j) = \left(1 - \frac{\sum_{i=1}^{n} \text{unique item}(i, j)}{\sum_{k=1}^{n} \text{amount}(i, j)}\right) \quad (6)$$

unique item$(i, j) = 1$ if amount $(i, j) \geq 1$, else $0$ \quad (7)

where Stickiness(j) denotes the repeat-purchase propensity of consumer j, amount(i,j) is the quantity of products i purchased by consumer j, n is the total number of products, and unique item(i,j) has a value of 1 when consumer j has purchased product i and has a value of 0 when consumer j has not purchased product i.

In an embodiment, the modified self-similarity calculation unit may combine the repeat-purchase propensity with the modified self-similarity and calculate the modified self-similarity, as shown in Equation 8 below:

$$MSS(i,j) = \text{Repurchase rate}(i) \times \text{Preference}(i,j) \times \text{Stickiness}(j) \times \text{Weight} \quad (8)$$

In an embodiment, the similarity calculation unit may represent the number of products (m) purchased by the user and the total number of products (n) by a similarity matrix in the form of m×n and calculate the sums of similarities between products by using the modified self-similarity (MSS) calculated by the modified self-similarity calculation unit.

In an embodiment, the product recommendation unit may recommend a preset number of products in descending order of the sums of similarities between products, or may recommend one or more products having a similarity level equal to or higher than a preset level.

According to another aspect of the present invention, there is provided a method for recommending repeat-purchase products using modified self-similarity, the method being performed by a computer in an environment in which user equipment (UE), a database, and a web server are connected over a network, the method including: step S100 of receiving, by a user information reception unit, user information from the database when the UE connects with the web server; step S200 of calculating, by a modified self-similarity calculation unit, a modified self-similarity (MSS) using the user information received by the user information reception unit; step S300 of calculating, by a similarity calculation unit, the sums of similarities between products by substituting the modified self-similarity, calculated by the modified self-similarity calculation unit, into an inter-product similarity calculation matrix; and step S400 of aligning, by a product recommendation unit, the sums of similarities between products calculated by the similarity calculation unit, and transmitting, by the product recommendation unit, product information fulfilling preset criteria to the UE.

In an embodiment, step S200 may include step S210 of calculating, by the modified self-similarity calculation unit, a repurchase rate, step S220 of calculating, by the modified self-similarity calculation unit, a preference, and step S230 of assigning, by the modified self-similarity calculation unit, a weight, and may calculate the modified self-similarity by Equation 1 below:

$$MSS(i,j) = \text{Repurchase rate}(i) \times \text{Preference}(i,j) \times \text{Weight} \quad (1)$$

where MSS is the modified self-similarity, MSS(i,j) is the modified self-similarity value of consumer j for product i Repurchase rate (i) is the repurchase rate of product i Preference(i,j) is consumer j's preference for product i, and Weight is a weight value.

In an embodiment, at step S210, a repurchase rate calculation unit provided in the modified self-similarity calculation unit may calculate the repurchase rate by Equation 2 below:

$$\text{Repurchase rate}(i) = 1 - \frac{\text{Users }(i, 1)}{\sum_{k=1}^{max} \text{Users }(i, k)} \quad (2)$$

where Users(i,k) denotes the number of consumers who have purchased product i k times.

In an embodiment, at step S220, a preference calculation unit provided in the modified self-similarity calculation unit may calculate the preference by Equation 3 below:

$$\text{Preference }(i, j) = \frac{\text{amount }(i, j)}{\sum_{i=1}^{n} \text{amount }(i, j)} \quad (3)$$

where amount(i,j) denotes the quantity of products i purchased by consumer j, and n denotes the total number of products.

According to still another aspect of the present invention, there is provided a computer-readable storage medium having stored thereon a program that is executed by a computer and is configured to perform: step S100 of receiving, by a user information reception unit, user information from a database when user equipment (UE) connects with a web server; step S200 of calculating, by a modified self-similarity calculation unit, modified self-similarity (MSS) using the user information received by the user information reception unit; step S300 of calculating, by a similarity calculation unit, the sums of similarities between products by substituting the modified self-similarity, calculated by the modified self-similarity calculation unit, into an inter-product similarity calculation matrix; and step S400 of aligning, by a product recommendation unit, the sums of similarities between products calculated by the similarity calculation unit, and transmitting, by the product recommendation unit, product information fulfilling preset criteria to the UE.

According to still another aspect of the present invention, there is provided a computer program that is combined with hardware and is stored in a computer-readable recording medium in order to perform the method for recommending repeat-purchase products using modified self-similarity according to the present invention by a computer.

BRIEF DESCRIPTION OF THE DRAWINGS

The above and other objects, features, and advantages of the present invention will be more clearly understood from the following detailed description taken in conjunction with the accompanying drawings, in which:

FIG. 5 shows an embodiment of a method for calculating similarities between products in collaborative filtering;

FIG. 6 shows an embodiment of a similarity calculation method including products previously purchased by a consumer;

FIG. 7 shows an embodiment of a product similarity matrix including self-similarities;

FIG. 8 shows an embodiment of an inter-product similarity calculation matrix using modified self-similarity (MSS); and FIG. 9 shows comparisons in performance between various recommendation systems.

DETAILED DESCRIPTION

Figure 1:
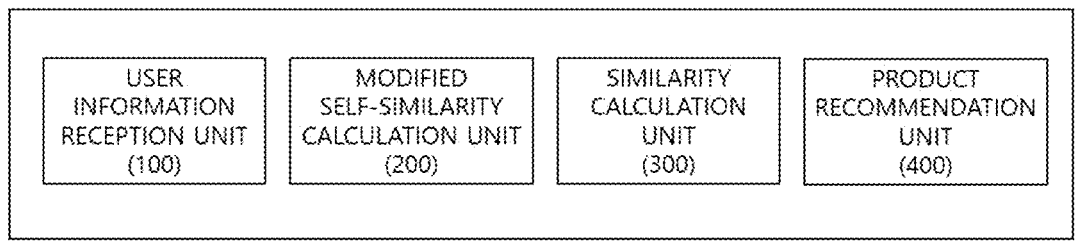
FIG. 1 shows the configuration of a system for recommending repeat-purchase products using modified self-similarity according to the present invention.
Figure 2:
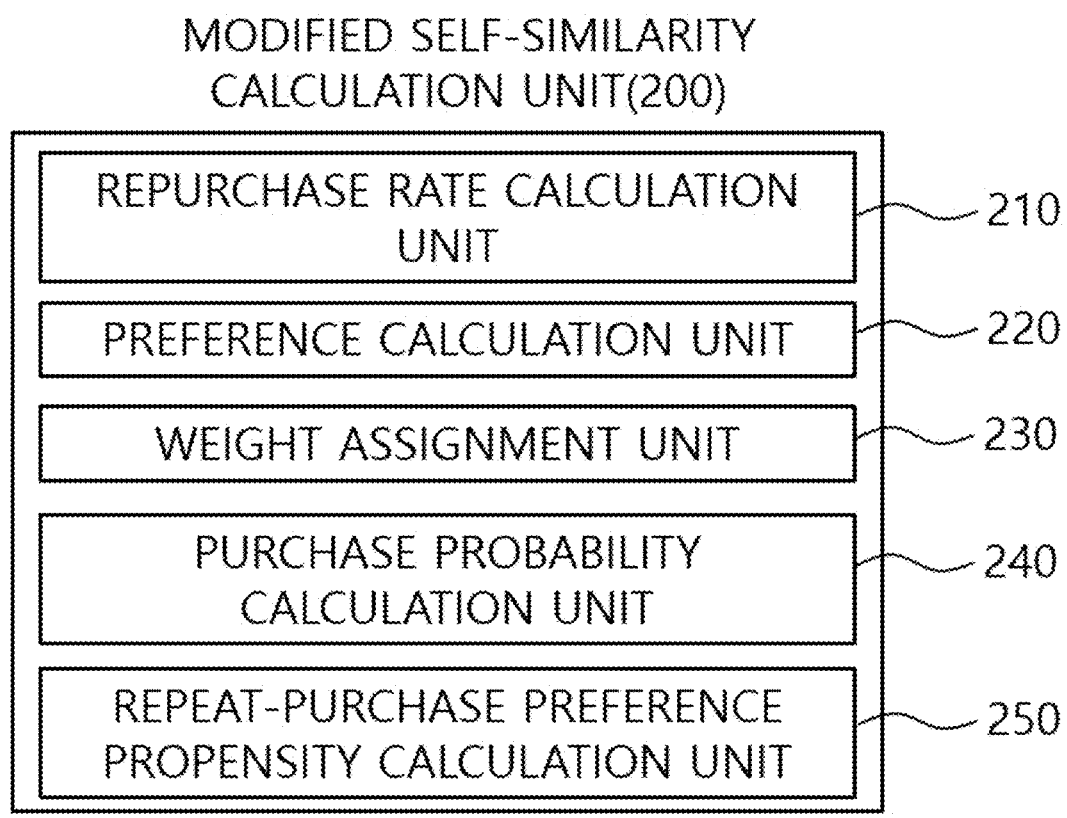
FIG. 2 shows the configuration of a modified self-similarity calculation unit according to the present invention.
Figure 3:
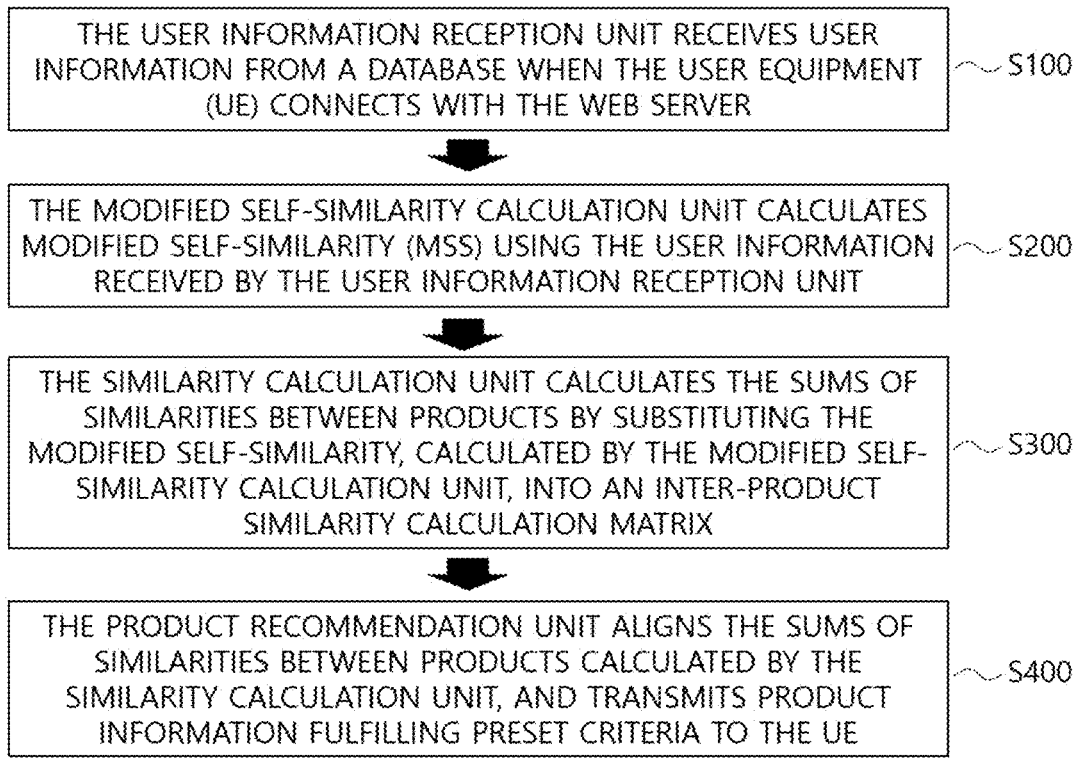
FIG. 3 is a flowchart showing a method for recommending repeat-purchase products using modified self-similarity according to the present invention.

Embodiments of the present invention will be described with reference to the accompanying drawings below so that those of ordinary skill in the art to which the present invention pertains can easily implement the present invention. As can be easily understood by those of ordinary skill in the art to which the present invention pertains, embodiments to be described below may be modified in various forms without departing from the spirit and scope of the present invention. Wherever possible, the same reference numbers will be used throughout the drawings to refer to the same or like parts.

The terminology used herein is intended merely to illustrate specific embodiments, and is not intended to limit the present invention. As used herein, the singular forms "a," "an," and "the" are intended to include the plural forms as well, unless the context clearly indicates otherwise.

The terms "include," "comprise," "including," and "comprising," and their derivatives specify the presence of one or more described features, regions, integers, steps, operations, elements, parts and/or components, and do not preclude the presence or addition of one or more other features, regions, integers, steps, operations, elements, parts, components, and/or groups thereof.

All terms including technical or scientific terms used herein have the same meanings as commonly understood by those of ordinary skill in the art to which the present invention pertains. It will be further understood that terms, such as those defined in commonly used dictionaries, should be interpreted as having meanings that are consistent with their meanings in the context of the specification and relevant art and should not be interpreted in an idealized or overly formal sense unless expressly so defined herein.

The present invention intends to provide a collaborative filtering recommendation system and method that include products already purchased by a consumer in a recommendation list of the recommendation system.

To this end, first, the present invention intends to provide a collaborative filtering recommendation system and method that utilize the similarity between products or users, which is an advantage of collaborative filtering, for recommendation even in a repeat-purchase recommendation system. The present invention intends to provide a collaborative filtering recommendation system and method that incorporate the number of a consumer's past repeat purchases into a recommendation so that a product repeatedly purchased by the consumer can be recommended to the consumer with a higher probability. The present invention intends to provide a collaborative filtering recommendation system and method in which a product repeatedly purchased a large number of times has a high probability of being recommended, and a product repeatedly purchased a small number of times is also recommended according to a general recommendation algorithm.

Second, the present invention intends to provide a collaborative filtering recommendation system and method in which a company and an analyst may freely devise and select various pieces of information necessary for repeat-purchase recommendation and may freely combine, separate and utilize the pieces of information as needed in a collaborative filtering recommendation system algorithm presented in the present invention.

Third, the present invention intends to provide a recommendation system and method that may evaluate a consumer suitable for the utilization of a repeat-purchase recommendation system by measuring the consumer's repeat-purchase propensity. The frequency at which repeat purchases occur varies depending not only on the product but also on the consumer. The present invention intends to provide a method that incorporates a consumer's repeat-purchase propensity into recommendation.

The present invention proposes a new collaborative filtering recommendation technique in which the collaborative filtering recommendation technique that has not been utilized in the conventional repeat-purchase recommendation systems is modified to fit a repeat-purchase recommendation system. This method is a new method that is different from the conventional methods in the following aspects:

First, while the conventional collaborative filtering technique recommends only new products that a consumer has not purchased in the past, the collaborative filtering technique presented in the present invention enables appropriate recommendations for products that a consumer has already purchased according to his or her repeat-purchase propensity, so that it may acquire more accurate recommendation results than the conventional collaborative filtering technique in connection with the recommendation of products for which repeated purchases have been observed.

Second, in the conventional collaborative filtering recommendation systems, only whether each consumer purchased each product in the past is determined and the results of the determination are utilized in the form of binary data. In this case, loss of information about the number of purchases by the consumer occurs. In contrast, the collaborative filtering recommendation system proposed in the present invention may incorporate the number of purchases of each product by a consumer into its recommendation without loss of information.

Third, since the conventional collaborative filtering techniques utilize only binary data to identify and use only whether a consumer has purchased each product, information about whether each product is repeatedly purchased cannot be used for recommendation. The collaborative filtering recommendation system proposed in the present invention proposes a new recommendation system that combines product repeat purchase possibility with the conventional collaborative filtering recommendation system.

Fourth, the conventional collaborative filtering techniques simply refer to each consumer's product purchase history when calculating similarity even when an analyst knows other types of information that can be helpful in recommendation. However, the collaborative filtering recommendation system proposed in the present invention may combine various pieces of information, which the analyst determines to be meaningful in recommendation, with the calculation of similarity. Examples of the information that can be combined include the number of purchases of a product by a consumer, a product repurchase rate, and a consumer's repeat-purchase propensity.

Fifth, studies on the conventional repeat-purchase recommendation systems do not provide measurement and evaluation indices for a consumer to whom the utilization of the repeat-purchase recommendation system is helpful. The system presented in the present invention may identify a consumer and a product suitable for the utilization of the repeat-purchase recommendation system through the measurement and evaluation of the consumer's repeat-purchase propensity.

The conventional collaborative filtering recommendation techniques calculate and utilize the similarity between consumers or between products in order to recommend a new product. First, in the case where the similarity between consumers are utilized, when consumer 1 has purchased products A, B, and C, and consumer 2 with a high similarity to consumer 1 has purchased products A, B, C, and D, product D is recommended. In the case where the similarity between consumers is utilized as described above, only a new product may be recommended, and a repeat-purchase recommendation for a previously purchased product may not be made.

Meanwhile, in the case where the similarity between products is utilized, when consumers who have purchased product A are consumers 1, 2, 3, and 4, and consumers who have purchased product B are consumers 1, 2, and 3, it may be considered that product A and product B have a high similarity therebetween. In this case, when consumer 4 has purchased product A but has not yet purchased product B, product B is recommended to consumer 4. The calculation of the similarity between these products is illustrated as shown in FIG. 5.

FIG. 5 shows an embodiment of a method for calculating similarities between products in collaborative filtering.

For example, when the total number of items is n and a consumer has purchased items 4, 57, 96, and 200, similarities between the four items purchased by the consumer and the remaining items obtained. Then, N items with the highest similarity together with the four items already purchased are recommended to the corresponding consumer.

As described above, in the conventional collaborative filtering, one or more products purchased by a consumer are excluded from a recommendation. In contrast, in the present invention, in order to construct a repeat-purchase recommendation system capable of recommending even one or more products purchased by a consumer, the products already purchased by the consumer are also included in the calculation of similarities between products. This is illustrated in FIG. 6.

FIG. 6 shows an embodiment of a similarity calculation method including products previously purchased by a consumer.

In other words, when the number of products purchased by the consumer is m and the total number of products is n, a product similarity matrix in the form of m×(n−m) is generated in the conventional collaborative filtering interproduct similarity calculation method, whereas a similarity matrix in the form of m×n is used in the present invention. The reason for this is to enable one or more products already purchased by the consumer to be included in recommendation. In the present specification, the similarity between product i and product j is represented by $S_{ij}$. In addition, the similarity between product i and product i is defined as "self-similarity," and is represented by $S_{ii}$.

FIG. 7 shows an embodiment of a product similarity matrix including self-similarities.

The similarity $S_{ij}$ between product i and product j can be considered to be a value indicating information about how similar the purchasing pattern of the original consumer of the product i and the purchasing pattern of the consumer of the product j are. Accordingly, for any product, the self-similarity, which is the similarity between product i and product i, originally has a value of 1. The similarity $S_{ij}$ between different products cannot exceed 1 and usually has a value considerably smaller than 1. Accordingly, when 1 is entered in the value of $S_{ii}$ and then the top N products are recommended based on a purchased product similarity matrix for each consumer, the probability that past purchased products are included in a recommendation list is increased considerably (see FIG. 7).

In the case where a value of 1 is entered in the self-similarity, when N is the number of recommended products in the case of the recommendation of top N products, $M_k$ is the number of products purchased by consumer k in the past, and N>$M_k$, (N−$M_k$) products are recommended as new products with the highest total similarity to the products purchased by the consumer in the past, as in the conventional product-based collaborative filtering method. In contrast, when N<$M_k$, N products with the highest total product similarity among $M_k$ products are recommended.

When the similarity $S_{ij}$ between product i (item i) and product i (item i) is used as described above, the products that the consumer has previously purchased may be included in a recommendation list, and it may be technically possible to recommend one or more new products even to a consumer who has purchased few products in the past based on the similarity between products.

Meanwhile, as described above, all products that the consumer has purchased at least once in the past inevitably have a self-similarity value of 1, resulting in a problem in that information about the numbers of repeat purchases of one or more products that the consumer has purchased in the past is not incorporated into recommendation.

For example, the self-similarity values of both products purchased 10 times or purchased once by the consumer in the past are 1, and thus information about the consumer's repeat-purchase propensity for past purchased products is not incorporated into recommendation. In addition, even a product that is not repurchased due to the nature of the product will have a self-similarity value of 1 when the consumer has purchased the product in the past. Accordingly, there is a problem in that the probability of recommending one or more products that are not generally repurchased to the consumer increases.

The present invention will be described in greater detail below with reference to the drawings. For reference, the drawings may be partially exaggerated in order to describe some features of the present invention. In this case, it is preferable to interpret the drawings in the overall context of the present specification.

FIG. 1 shows the configuration of a system for recommending repeat-purchase products using modified self-similarity according to the present invention.

The present invention is directed to a product recommendation system that is operated by a computer in an environment in which user equipment (UE), a database, and a web server are connected over a network. More specifically, the present invention is directed to a system 10 for recommending repeat-purchase products using modified self-similarity, including a user information reception unit 100, a modified self-similarity calculation unit 200, a similarity calculation unit 300, and a product recommendation unit 400.

The user information reception unit 100 according to the present invention may receive user information from the database when the UE connects with the web server.

The UE refers to a terminal capable of transmitting and receiving data to and from the web server WS over the communication network. The UE may be any one of a mobile communication terminal, a personal digital assistant (PDA), a tablet computer, a notebook computer, a desktop computer, and the like. The UE refers to a terminal equipped with memory configured to store a program for transmitting and receiving data via a wired/wireless connection, and a microprocessor configured to execute the program and perform calculation and control.

The network using a computer may be a wired/wireless communication network, and may be any network including a LAN, a WAN, etc. However, it is more preferable to implement the network as an Internet network.

The web server WS may be a shopping mall site or a portal site (or a recommendation site) that provides recommendation information according to a recommendation situation for a user. In addition, as another implementation method, the web server WS may be a general website that is linked to a portal site or the like and provides information according to a user's request.

The database may be provided inside the web server, or may be provided separately from the web server.

Meanwhile, a product recommendation may be requested by a user himself or herself, or may be made by a website with which the user connects on behalf of a user based on independent determination even when there is no explicit request from the user. For example, when the user visits a website and a web page for recommendation is provided, the website may provide a recommendation list by itself without a request for a recommendation from the user.

The user information received by the user information receiving unit 100 according to the present invention includes information about the user's past purchased products and information about the numbers of purchases.

The modified self-similarity calculation unit 200 according to the present invention may calculate a modified self-similarity (MSS) by using the user information received from the user information reception unit 100.

The similarity calculation unit 300 according to the present invention may calculate the sums of similarities between products by substituting the modified self-similarity, calculated by the modified self-similarity calculation unit 200, into a similarity calculation matrix between products.

The product recommendation unit 400 according to the present invention may align the sums of the similarities between products calculated by the similarity calculation unit 300, and may transmit product information fulfilling preset criteria to the UE.

A configuration for calculating a modified self-similarity in the modified self-similarity calculation unit 200 according to the present invention will be described below.

The modified self-similarity calculation unit 200 according to the present invention may include a repurchase rate calculation unit 210, a preference calculation unit 220, and a weight assignment unit 230, and may calculate the modified self-similarity by Equation 1 below:

$$MSS(i,j) = \text{Repurchase rate}(i) \times \text{Preference}(i,j) \times \text{Weight} \qquad (1)$$

In the case of the present invention, in order to resolve the above-mentioned problems that occur when a consumer adds a purchased product to a similarity matrix while including the previously purchased product in similarity calculation targets, the self-similarity of the already purchased product may be modified into a value that is not 1. The purpose of this modification is to calculate the probability that consumer j will repurchase product i.

In the present invention, this is defined as modified self-similarity (MSS) (see Equation 1).

In Equation 1, MSS is the modified self-similarity, and MSS(i,j) is the modified self-similarity value of consumer j for product i. The modified self-similarity of consumer j for product i means that the self-similarity value of a product is determined to be different depending on the consumer.

Repurchase rate (i) is the repurchase rate of product i, and Preference(i,j) is consumer j's preference for product i. Weight, i.e., a weight value, is a parameter of the function.

The most accurate value may be selected as the weight according to the present invention by comparing the accuracies of various weights using the purchase data of the consumer after the repurchase rate and the preference have been calculated.

The repurchase rate calculation unit 210 according to the present invention may calculate the repurchase rate by Equation 2 below:

$$\text{Repurchase rate}(i) = 1 - \frac{\text{Users }(i, 1)}{\sum_{k=1}^{max} \text{Users }(i, k)} \qquad (2)$$

where Repurchase rate(i) is the repurchase rate of product i and denotes a repurchase propensity, and Users(i,k) denotes the number of consumers who have purchased product i k times.

The repurchase rate of the product is used for the modified self-similarity as described above, and thus it may be possible to filter out one or more products that are not repurchased due to the natures of the products. The products that are not repurchased due to the natures of the products may include books, movies, and the like. It is obvious that although a consumer may repurchase the same book, books are generally products that are rarely repurchased.

Meanwhile, a product having a repurchase rate of 0 has a modified self-similarity of 0, and thus the probability of recommending the product to a person who has already purchased the product is considerably low. Furthermore, a product with a higher repurchase rate is recommended with a higher probability than other products as the modified self-similarity value thereof increases, whereas a product with a lower repurchase rate is recommended with a lower probability than other products.

The preference calculation unit 220 according to the present invention may calculate the preference by Equation 3 below:

$$\text{Preference }(i, j) = \frac{\text{amount }(i, j)}{\sum_{i=1}^{n} \text{amount }(i, j)} \qquad (3)$$

Preference(i,j), which is consumer j's preference for product i, is calculated by Equation 3 above. In Equation 3, amount(i,j) denotes the quantity of products i purchased by consumer j, and n denotes the total number of products. The consumer's product preference is utilized, so that a product that has been purchased more by a consumer has a higher modified self-similarity value, and thus the product is recommended with a higher probability.

Meanwhile, when two or more products have the same product preference and the same product repurchase rate, the modified self-similarity values thereof become the same, in which case a product having a higher similarity value between products according to the conventional collaborative filtering is recommended.

An inter-product similarity calculation matrix of collaborative filtering using modified self-similarity (MSS) according to the present invention is shown in FIG. 8. FIG. shows an embodiment of an inter-product similarity calculation matrix using modified self-similarity (MSS).

In other words, the collaborative filtering recommendation system using modified self-similarity proposed in the present invention recommends N products with the highest similarities to the products purchased by the user among all products through similarity calculation using the modified self-similarity.

In the present invention, only the repurchase rate of the product, the consumer's preference for the product, the consumer's repeat-purchase propensity, and the weight parameter are used for the modified self-similarity. However, a variable that is determined to have a significant effect on repurchase in the industry to which a company or analyst belongs may be added and utilized as an additional element of the modified self-similarity.

An embodiment in which a product is recommended by additionally considering the element of a product group having a clear product purchase cycle and an embodiment in which a product is recommended by additionally considering the element of a consumer's repeat-purchase propensity will be described below.

First, the embodiment in which a product is recommended by additionally considering the element of a product group having a clear product purchase cycle will be described.

For example, when a recommended product group is a product group with a clear purchase cycle such as bottled water, diapers, or the like, a purchase probability variable based on a consumer's product purchase cycle may be defined, and added and utilized as an element of the modified self-similarity.

To this end, the modified self-similarity calculation unit 200 according to the present invention may further include a purchase probability calculation unit 240, and may calculate the purchase probability by Equation 4 below:

$$P_c(i, j) = \frac{1}{|(R_t - C_t(i, j)) - P_c(i)|} \quad (4)$$

In the present invention, the consumer's product purchase cycle may be obtained using Equation 4.

In Equation 4, $P_c(i,j)$ denotes the probability that consumer j will purchase product i according to the degree to which the purchase cycle arrives. $R_t$ denotes the time at which the recommendation system makes a recommendation, and $C_t(i,j)$ denotes the time at which consumer j last purchased product i. Accordingly, the value of $(R_t-C_t(i,j))$ denotes the interval between the time at which a recommendation is made and the time at which consumer j last purchased product i.

The value of $P_c(i)$ denotes the mode or median of the purchase cycle of product i observed for a predetermined period of time.

For example, when $R_t$=2020/07/31, $C_t(i,j)$=2020/07/01, and $P_c(i)$=30, 31 days have passed since the time at which the consumer last purchased product i at the time at which a recommendation is made, which is considerably close to a 30-day product purchase cycle. Accordingly, $P_c(i,j)$, which is the probability that consumer j will purchase product i, has a high value.

In contrast, when $R_t$=2020/07/31, $C_t(i,j)$=2020/07/30, and $P_c(i)$=30, only one day has passed since the time at which the consumer last purchased product i at the time at which a recommendation is made, and the mode of the product purchase cycle is 30 days. Accordingly, the probability that consumer j will repurchase product i becomes low. When this is combined with the modified self-similarity, there is given Equation 5 below.

In other words, the modified self-similarity calculation unit 200 according to the present invention may combine the purchase probability and calculate the modified self-similarity for a product having a product purchase cycle, as in Equation 5 below:

$$MSS(i,j)=\text{Repurchase rate}(i) \times \text{Preference}(i,j) \times P_c(i,j) \times \text{Weight} \quad (5)$$

Next, the embodiment in which a product is recommended by additionally considering the element of a consumer's repeat-purchase propensity will be described.

For example, a consumer's repeat-purchase propensity may be combined with and utilized in conjunction with the modified self-similarity.

To this end, the modified self-similarity calculation unit 200 according to the present invention may further include a repeat-purchase propensity calculation unit 250, and may calculate the repeat-purchase propensity by Equations 6 and 7 below:

$$\text{Stickiness }(j) = \left(1 - \frac{\sum_{i=1}^{n} \text{unique item }(i, j)}{\sum_{k=1}^{n} \text{amount }(i, j)}\right) \quad (6)$$

$$\text{unique item }(i, j) = 1 \text{ if amount }(i, j) \geq 1, \text{ else } 0 \quad (7)$$

where Stickiness(j) denotes the repeat-purchase propensity of consumer j, amount(i,j) is the quantity of products i purchased by consumer j, and n is the total number of products. unique item(i,j) has a value of 1 when consumer j has purchased product i, and has a value of 0 when consumer j has not purchased product i.

Stickiness(j), which is the repeat-purchase propensity (stickiness) of consumer j, may be calculated as shown in FIG. 6.

The stickiness indicates how strong each consumer's repeat-purchase propensity is. For example, when the stickiness of consumer j is 80, consumer j corresponds to a case where 80% of all purchased products are repurchased products.

Meanwhile, there may be various methods, including linear coupling, nonlinear coupling, and the like, as methods of combining a variable by incorporating information helpful in product recommendation into the modified self-similarity as a variable.

The modified self-similarity calculation unit 200 according to the present invention may combine a repeat-purchase propensity with a modified self-similarity and calculate the modified self-similarity, as shown in Equation 8 below:

$$MSS(i,j)=\text{Repurchase rate}(i) \times \text{Preference}(i,j) \times \text{Stickiness}(j) \times \text{Weight} \quad (8)$$

Next, the similarity calculation unit 300 will be described.

The similarity calculation unit 300 according to the present invention may calculate the sums of similarities between products by substituting the modified self-similarity. calculated by the modified self-similarity calculation unit 200, into the between products similarity calculation matrix.

The similarity calculation unit 300 may represent the number of products (m) purchased by the user and the total number of products (n) by a similarity matrix in the form of m×n and calculate the sums of similarities between products by using the modified self-similarity (MSS) calculated by the modified self-similarity calculation unit 200 (see FIG. 8).

Next, the product recommendation unit 400 will be described.

The product recommendation unit 400 according to the present invention may recommend a preset number of products in descending order of the sums of similarities between products, or may recommend one or more products having a similarity level equal to or higher than a preset level.

For example, a product having the highest sum of similarities between products may be recommended, or top three products may be recommended. Alternatively, a product corresponding to a predetermined similarity value or higher may be recommended based on the similarity value.

The products recommended by the product recommendation unit 400 are displayed on the UE, and thus the user may make a final purchase selection by referring to the recommended products.

Meanwhile, in order to evaluate the performance of the recommendation system according to the present invention, comparison with the performances of other recommendation systems was performed.

In order to compare the performance of the repeat purchase product recommendation system according to the present invention with the performances of several conventional repeat-purchase recommendation systems, a performance evaluation was performed using the sales history dataset of an e-commerce company that sells fitness and health supplement products. The sales dataset of the e-commerce company used for performance comparison is a dataset consisting of a total of 268,014 product orders by individual consumers during the period from Jan. 1, 2018 to May 22, 2020. During the period, a total of 36,439 consumers purchased a total of 1,718 unique products.

For performance comparison with various recommendation systems, the performances of the following five recommendation systems were compared.

1) A bestseller recommendation method
2) A conventional item (product) similarity-based collaborative filtering recommendation method
3) A method of recommending one or more products most purchased in the past by each consumer first and additionally recommending one or more bestsellers when the number of products purchased in the past by the consumer is smaller than the number of recommended products (which is denoted by "a most purchased product and bestseller combination method" in FIG. 9)
4) A method of recommending one or more products most purchased in the past by each consumer first and additionally recommending one or more products with high similarity to the consumer's purchased products when the number of products purchased in the past by the consumer is smaller than the number of recommended products (which is denoted by "a most purchased product recommendation and collaborative filtering combination method" in FIG. 9)
5) A system for recommending repeat purchase products using modified self-similarity according to the present invention (which is denoted by a "modified self-similarity-based recommendation system" in FIG. 9)

As a performance evaluation index, F1, which is the most commonly used index for the performance evaluation of recommendation systems, was used. F1 is the harmonic average of precision and recall, and is calculated by calculation equation 9 below:

$$F1 = 2 \times \frac{\text{Recall} \times \text{Precision}}{\text{Recall} + \text{Precision}} \tag{9}$$

The performance evaluation results are indicated in FIG. 9. As a result of the performance comparison evaluation, it was observed that the "modified self-similarity-based recommendation system" proposed in the present invention had the best performance regardless of the number of recommendations.

In particular, the smaller the number of recommendations, the higher the predictive power. Since the recommendation system recommends a small number of products that a consumer will like, this is a meaningful result.

In particular, when the fact that the average number of products purchased per transaction was 2.73 during the experimental period of the e-commerce company used in this experiment is taken into consideration, it is positive that the top three recommendation had the best performance and the system of the present invention showed the most significant difference in performance with the other recommendation systems.

The method of modifying self-similarity, combining a plurality of variables with the modified self-similarity, and utilizing this together with the item similarity of the conventional collaborative filtering in product recommendation, which is proposed in the present invention, has the following advantages:

First, there may be improved the accuracy of recommendation results for products that are repeatedly purchased. As can be seen from the experimental results, the recommendation method using modified self-similarity provides more accurate recommendations to consumers than the conventional recommendation techniques in connection with the recommendation of products for which repeat purchases have been observed.

Second, a wide range of selection opportunities are provided to consumers by expanding recommendation target products. The conventional recommendation systems are methods for recommending only new products or recommending only products that have been purchased in the past. In the present invention, the collaborative filtering technique for recommending only new products is modified into a technique capable of recommending also products that consumers have already purchased in the past. This has the effect of expanding recommendation target products.

Third, the modified self-similarity of the present invention is designed such that an analyst can combine and separate a number of variables, which are determined to be meaningful for recommendation, with and from itself. Accordingly, the recommendation performance of the recommendation system may be further enhanced according to the analyst's capability and selection. In addition, the system of the present invention may be used flexibly by combining and separating various variables according to the situation and the characteristics of each business type.

Meanwhile, the present invention may be implemented as a method for recommending repeat-purchase products using modified self-similarity. Since the recommendation method has substantially the same technical configuration as the recommendation system, redundant descriptions will be omitted and the following description will be given with a focus on the gist of the method.

The present invention is directed to a method for recommending repeat-purchase products using modified self-similarity, the method being performed by a computer in an environment in which user equipment (UE), a database, and a web server are connected over a network, the method including: step S100 of receiving, by the user information reception unit 100, user information from the database when the UE connects with the web server; step S200 of calculating, by the modified self-similarity calculation unit 200, a modified self-similarity (MSS) using the user information received by the user information reception unit 100; step S300 of calculating, by the similarity calculation unit 300, the sums of similarities between products by substituting the modified self-similarity, calculated by the modified self-similarity calculation unit 200, into an inter-product similarity calculation matrix; and step S400 of aligning, by the product recommendation unit 400, the sums of similarities between products calculated by the similarity calculation unit 300, and transmitting, by the product recommendation unit 400, product information fulfilling preset criteria to the UE.

Step S200 according to the present invention may include step S210 of calculating, by the modified self-similarity calculation unit 200, a repurchase rate, step S220 of calculating, by the modified self-similarity calculation unit 200, a preference, and step S230 of assigning, by the modified self-similarity calculation unit 200, a weight, and may calculate the modified self-similarity by Equation 1 below:

$$MSS(i,j) = \text{Repurchase rate}(i) \times \text{Preference}(i,j) \times \text{Weight} \quad (1)$$

At step S210 according to the present invention, the repurchase rate calculation unit 210 provided in the modified self-similarity calculation unit 200 may calculate the repurchase rate by Equation 2 below:

$$\text{Repurchase rate}(i) = 1 - \frac{\text{Users }(i, 1)}{\sum_{k=1}^{max} \text{Users }(i, k)} \quad (2)$$

At step S220 according to the present invention, the preference calculation unit 220 provided in the modified self-similarity calculation unit 200 may calculate the preference by Equation 3 below:

$$\text{Preference }(i, j) = \frac{\text{amount }(i, j)}{\sum_{i=1}^{n} \text{amount }(i, j)} \quad (3)$$

Meanwhile, the present invention may be implemented as a computer-readable storage medium.

The storage medium according to the present invention may be implemented as a computer-readable storage medium having stored thereon a program that is executed by a computer and is configured to perform: step S100 of receiving, by the user information reception unit 100, user information from the database when the UE connects with the web server; step S200 of calculating, by the modified self-similarity calculation unit 200, a modified self-similarity (MSS) using the user information received by the user information reception unit 100; step S300 of calculating, by the similarity calculation unit 300, the sums of similarities between products by substituting the modified self-similarity, calculated by the modified self-similarity calculation unit 200, into an inter-product similarity calculation matrix; and step S400 of aligning, by the product recommendation unit 400, the sums of similarities between products calculated by the similarity calculation unit 300, and transmitting, by the product recommendation unit 400, product information fulfilling preset criteria to the UE.

Furthermore, the present invention may be implemented as a computer program.

The computer program according to the present invention may be implemented as a computer program that is combined with hardware and is stored in a computer-readable recording medium in order to perform the method for recommending repeat-purchase products using modified self-similarity according to the present invention by a computer.

Figure 4:
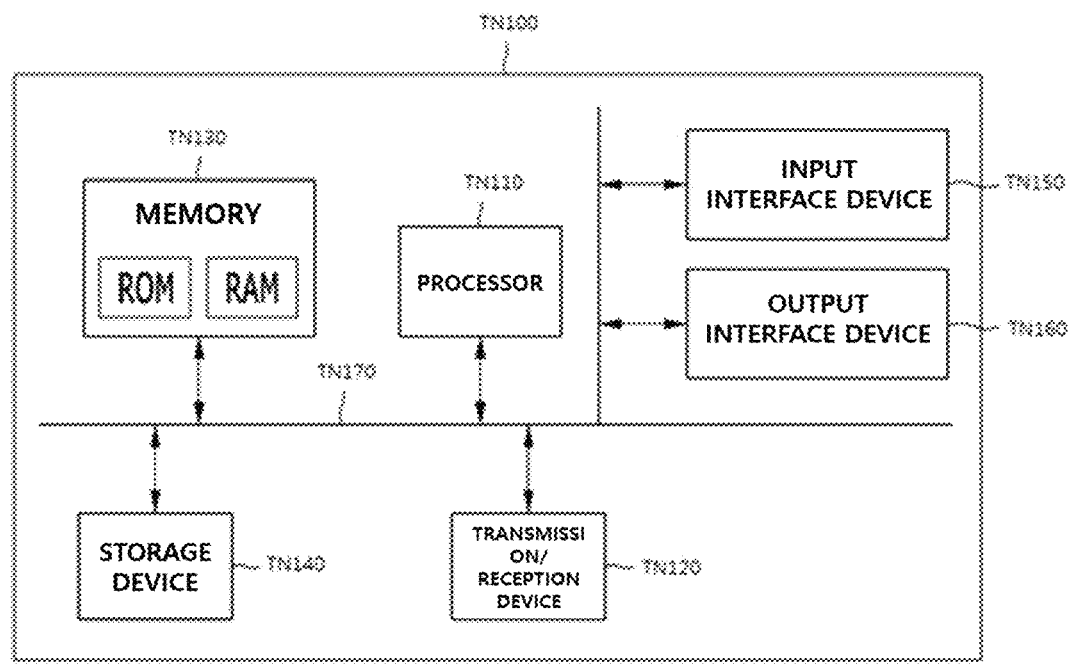
FIG. 4 is a diagram showing a computing device according to the present invention.

FIG. 4 is a diagram showing a computing device according to an embodiment of the present invention. The computing device TN100 of FIG. 4 may be a user-customized recommendation information provision device described herein.

In the embodiment of FIG. 4, the computing device TN100 may include at least one processor TN110, a transmission/reception device TN120, and memory TN130. The computing device TN100 may further include a storage device TN140, an input interface device TN150, an output interface device TN160, and the like. The components included in the computing device TN100 may be connected via a bus TN170 and communicate with each other.

The processor TN110 may execute program instructions stored in at least one of the memory TN130 and the storage device TN140. The processor TN110 may refer to a central processing unit (CPU), a graphics processing unit (GPU), or a dedicated processor configured to perform the methods according to the embodiments of the present invention. The processor TN110 may be configured to implement the procedures, the functions, and the methods described in connection with the embodiments of the present invention. The processor TN110 may control the individual components of the computing device TN100.

Each of the memory TN130 and the storage device TN140 may store various types of information related to the operation of the processor TN110. Each of the memory TN130 and the storage device TN140 may be configured as at least one of a volatile storage medium and a nonvolatile storage medium. For example, the memory TN130 may be configured as at least one of read-only memory (ROM) and random access memory (RAM).

The transmission/reception device TN120 may transmit or receive a wired signal or a wireless signal. The transmission/reception device TN120 may connect with a network and perform communication.

Meanwhile, each of the methods according to the embodiments of the present invention may be implemented in the form of a program readable through various computer means and recorded in a computer readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. These hardware devices may be configured to operate as one or more software modules in order to perform the operation of the present invention, and the vice versa.

The system and method for recommending repeat-purchase products using modified self-similarity according to the present invention have the following effects:

First, the present invention provides the effect of recommending products while taking into consideration a user's repeat-purchase propensity.

Second, the present invention provides the effect of applying a collaborative filtering recommendation system that utilizes similarities between products, which is an advantage of collaborative filtering, for recommendation in a repeat-purchase recommendation system.

Third, the present invention provides the effect of enabling a company and an analyst to freely devise and select pieces of information necessary for repeat-purchase recommendation as well as regular recommendation.

The effects of the present invention are not limited to the above-described effects, and other effects that have not been described above will be clearly understood by those of ordinary skill in the art to which the present invention pertains from the foregoing description.

The embodiments described herein and the accompanying drawings are merely illustrative of some of the technical spirit included in the present invention. Accordingly, since the embodiments disclosed herein are intended to illustrate the technical spirit of the present invention rather than limiting the technical spirit of the present invention, it is obvious that the scope of the technical spirit of the present invention is not limited to these embodiments. Modifications and specific embodiments that can be easily inferred by those skilled in the art within the scope of the technical spirit included in the specification and drawings of the present invention should be interpreted as being included in the scope of the present invention.

What is claimed is:

1. A system for recommending repeat-purchase products using modified self-similarity, the system being operated by a computer in an environment in which user equipment (UE), a database, and a web server are connected over a network, the system comprising:
   a memory configured to store one or more instructions; and
   a processor configured to execute the one or more instructions, wherein the processor is configured, by executing the one or more instructions, to:
      receive user information from the database when the UE connects with the web server;
      calculate a modified self-similarity (MSS) using the user information;
      calculate sums of similarities between products by substituting the modified self-similarity into an inter-product similarity calculation matrix; and
      align the sums of similarities between products and to transmit product information fulfilling preset criteria to the UE,
   wherein the processor is further configured to calculate the modified self-similarity by Equation 1 below:

$$MSS(i,j) = \text{Repurchase rate }(i) \times \text{Preference}(i,j) \times \text{Weight} \qquad (1)$$

where MSS is the modified self-similarity, MSS(i,j) is a modified self-similarity value of consumer j for product i, Repurchase rate (i) is a repurchase rate of product i, Preference(i,j) is consumer j's preference for product i, and Weight is a weight value, and wherein the processor is further configured to calculate a purchase probability by Equation 4 below:

$$P_c(i, j) = \frac{1}{|(R_t - C_t(i, j)) - P_c(i)|} \qquad (4)$$

where $P_c(i,j)$ denotes a probability that consumer j will purchase product i according to a degree to which a purchase cycle arrives, $R_t$ denotes a time at which the recommendation system makes a recommendation, $C_t(i,j)$ denotes a point in time at which consumer j last purchased product i, a value of $(R_t - C_t(i,j))$ denotes an interval between a point in time at which a recommendation is made and a point in time at which consumer j last purchased product i, and $P_c(i)$ denotes a mode or median of a repurchase cycle time of product i.

2. The system of claim 1, wherein the user information comprises information about a user's past purchased products and information about numbers of purchases.

3. The system of claim 1, wherein the processor is further configured to calculate the repurchase rate by Equation 2 below:

$$\text{Repurchase rate}(i) = 1 - \frac{\text{Users }(i, 1)}{\sum_{k=1}^{max} \text{Users }(i, k)} \qquad (2)$$

where Users(i, k) denotes a number of consumers who have purchased product i k times.

4. The system of claim 1, wherein the processor is further configured to calculate the preference by Equation 3 below:

$$\text{Preference }(i, j) = \frac{\text{amount }(i, j)}{\sum_{i=1}^{n} \text{amount }(i, j)} \qquad (3)$$

where amount(i,j) denotes a quantity of products i purchased by consumer j, and n denotes a total number of products.

5. The system of claim 1, wherein the processor is further configured to combine the purchase probability and calculate the modified self-similarity for a product having a product purchase cycle, as in Equation 5 below:

$$MSS(i,j) = \text{Repurchase rate }(i) \times \text{Preference }(i,j) \times P_c(i,j) \times \text{Weight} \qquad (5).$$

6. The system of claim 1, wherein the processor is further configured to calculate a repeat-purchase propensity by Equations 6 and 7 below:

$$\text{Stickiness }(j) = \left(1 - \frac{\sum_{i=1}^{n} \text{unique item }(i, j)}{\sum_{k=1}^{n} \text{amount }(i, j)}\right) \qquad (6)$$

$$\text{unique item }(i, j) = 1 \text{ if amount }(i, j) \geq 1, \text{ else } 0 \qquad (7)$$

where Stickiness(j) denotes a repeat-purchase propensity of consumer j, amount(i,j) is a quantity of products i purchased by consumer j, n is a total number of products, and unique item(i,j) has a value of 1 when consumer j has purchased product i and has a value of 0 when consumer j has not purchased product i.

7. The system of claim 6, wherein the processor is further configured to combine the repeat-purchase propensity with the modified self-similarity and calculate the modified self-similarity, as shown in Equation 8 below:

MSS(i,j)=Repurchase rate (i)×Preference(i,j)×Stickiness(j)×Weight (8).

8. The system of claim 1, wherein the processor is further configured to represent a number of products (m) purchased by the user and a total number of products (n) by a similarity matrix in a form of m×n and calculate the sums of similarities between products by using the modified self-similarity (MSS).

9. The system of claim 1, wherein the processor is further configured to recommend a preset number of products in descending order of the sums of similarities between products, or recommend one or more products having a similarity level equal to or higher than a preset level.

10. A method for recommending repeat-purchase products using modified self-similarity, the method being performed by a computer in an environment in which user equipment (UE), a database, and a web server are connected over a network, the method comprising:
receiving, by a processor, user information from the database when the UE connects with the web server;
calculating, by the processor, a modified self-similarity (MSS) using the user information;
calculating, by the processor, sums of similarities between products by substituting the modified self-similarity into an inter-product similarity calculation matrix; and
aligning, by the processor, the sums of similarities between products, and transmitting, by the processor, product information fulfilling preset criteria to the UE,
wherein calculating the modified self-similarity comprises:
calculating a repurchase rate,
calculating a preference,
assigning a weight, and
calculating the modified self-similarity by Equation 1 below:

MSS(i,j)=Repurchase rate (i)×Preference(i,j)×Weight (1)

where MSS is the modified self-similarity, MSS(i,j) is a modified self-similarity value of consumer j for product i, Repurchase rate (i) is a repurchase rate of product i, Preference(i,j) is consumer j's preference for product i, and Weight is a weight value, and
wherein the method further comprises calculating a purchase probability by Equation 4 below:

$$P_c(i, j) = \frac{1}{|(R_t - C_t(i, j)) - P_c(i)|} \quad (4)$$

where $P_c(i,j)$ denotes a probability that consumer j will purchase product i according to a degree to which a purchase cycle arrives, $R_t$ denotes a time at which the recommendation system makes a recommendation, $C_t(i,j)$ denotes a point in time at which consumer j last purchased product i, a value of $(R_t-C_t(i,j))$ denotes an interval between a point in time at which a recommendation is made and a point in time at which consumer j last purchased product i, and $P_c(i)$ denotes a mode or median of a repurchase cycle time of product i.

11. The method of claim 10, wherein calculating the repurchase rate comprises calculating the repurchase rate by Equation 2 below:

$$\text{Repurchase rate}(i) = 1 - \frac{\text{Users }(i, 1)}{\sum_{k=1}^{max} \text{Users }(i, k)} \quad (2)$$

where Users(i,k) denotes a number of consumers who have purchased product i k times.

12. The method of claim 10, wherein calculating the preference comprises calculating the preference by Equation 3 below:

$$\text{Preference }(i, j) = \frac{\text{amount }(i, j)}{\sum_{i=1}^{n} \text{amount }(i, j)} \quad (3)$$

where amount(i,j) denotes a quantity of products i purchased by consumer j, and n denotes a total number of products.

13. A non-transitory computer-readable storage medium having stored thereon a program that is executed by a computer and is configured to perform:
receiving user information from a database when user equipment (UE) connects with a web server;
calculating modified self-similarity (MSS) using the user information;
calculating sums of similarities between products by substituting the modified self-similarity into an inter-product similarity calculation matrix; and
aligning the sums of similarities between products and transmitting product information fulfilling preset criteria to the UE,
wherein calculating the modified self-similarity comprises:
calculating a repurchase rate,
calculating a preference,
assigning a weight, and
calculating the modified self-similarity by Equation 1 below:

MSS(i,j)=Repurchase rate (i)×Preference(i,j)×Weight (1)

where MSS is the modified self-similarity, MSS(i,j) is a modified self-similarity value of consumer j for product i, Repurchase rate (i) is a repurchase rate of product i, Preference(i,j) is consumer j's preference for product i, and Weight is a weight value, and
wherein the program is further configured to perform calculating a purchase probability by Equation 4 below:

$$P_c(i, j) = \frac{1}{|(R_t - C_t(i, j)) - P_c(i)|} \quad (4)$$

where $P_c(i,j)$ denotes a probability that consumer j will purchase product i according to a degree to which a purchase cycle arrives, $R_t$ denotes a time at which the recommendation system makes a recommendation, $C_t(i,j)$ denotes a point in time at which consumer j last purchased product i, a value of $(R_t-C_t(i,j))$ denotes an interval between a point in time at which a recommendation is made and a point in time at which consumer j last purchased product i, and $P_c(i)$ denotes a mode or median of a repurchase cycle time of product i.

14. A computer program that is combined with hardware and is stored in a computer-readable recording medium in order to perform the method for recommending repeat-purchase products using modified self-similarity set forth in claim 10 by a computer.

15. A computer program that is combined with hardware and is stored in a computer-readable recording medium in order to perform the method for recommending repeat-purchase products using modified self-similarity set forth in claim 12 by a computer.

* * * * *